March 24, 1970   R. C. MURRAY   3,502,755
METHOD FOR FORMING INDENTATIONS IN ISOSTATICLY PRESSED ARTICLES
Filed March 18, 1968

INVENTOR.
Ronald C. Murray
BY
Barnard, McGlynn & Reising
ATTORNEYS

United States Patent Office 3,502,755
Patented Mar. 24, 1970

3,502,755
METHOD FOR FORMING INDENTATIONS IN ISOSTATICLY PRESSED ARTICLES
Ronald C. Murray, Golden, Colo., assignor to Coors Porcelain Company, Golden, Colo., a corporation of Colorado
Filed Mar. 18, 1968, Ser. No. 713,913
Int. Cl. B29c *1/14;* B28b *7/30*
U.S. Cl. 264—56      4 Claims

ABSTRACT OF THE DISCLOSURE

A method of isostaticly pressing ceramic shapes having an indentation in the end by using a thin walled rubber like member as an insert during filling of the mold and by fillling this insert with the same material as that used to fill the mold. During pressing the insert is compressed at essentially the same rate as the remaining material in the mold which allows arbors within the mold to move as the material is compressed around them. After molding the thin walled member and the material compressed within this member can be emoved from the pressed ceramic body either manually before firing or during firing by burning out the thin walled member.

---

This invention relates to method for the manufacture of articles from compactible materials such as ceramic or metal powder, and more particularly to a method and apparatus for isostatically pressing and then sintering a body having an indentation in the surface thereof.

One of the methods presently used for the manufacture of sintered ceramic articles is the so-called isostatic pressing process which is taught, for example, in United States Patents 2,251,454 and 2,290,910. In this process the ceramic material, prepared in a loose compactible finely divided form, is placed in a rubber or other elastomeric collapsible mold after which fluid pressure is applied to the outside of the elastomeric mold such that the mold partially collapses and thereby compacts or compresses the ceramic material into a self-sustaining green compact. Upon relieving the fluid pressure from the elastomeric mold, the mold withdraws by way of its own resiliency from the green compact and the compact is thus easily removed from the mold for subsequent firing to sinter the ceramic. One of the big advantages to this process is the excellent uniformity attained in compaction of the ceramic which assures excellent high density in the fired articles with minimum possibilities of warpage or other distortion during firing.

The chief limitation to this isostatic pressing process, as has heretofore been conventionally used, is that at the present state of the art, it can be effectively used only for the manufacture of relatively simple ceramic shapes such as rods and cylinders. In my co-pending United States patent application Ser. No. 660,550 filed July 19, 1967, which is a continuation-in-part of my application Ser. No. 434,380 filed Feb. 23, 1965, I have disclosed and claimed a method wherein the isostatic pressing technique can be used to manufacture complex ceramic shapes having one or more non-concentric bores or inserts, for example an elongated body with a plurality of parallel bores extending from one end to the other thereof. Briefly, such method involves the steps of placing one or more arbors within a generally tubular-shaped resilient collapsible mold, filling the mold with a compactible material after which the arbor or arbors are supported within the mold only by the compactible material such that the arbor or arbors are free to shift within the mold during compaction of the material, and thereafter applying pressure to the mold to compact the material. After compaction the arbor or arbors can be removed to provide a bored article or they can be left in place to provide an article with one or more inserts therein.

The present invention provides an improved method for manufacturing ceramic articles having one or more indentations in the surface thereof. The process is useful, for example, in combination with that of my aforesaid co-pending application to manufacture an elongated multi-bored ceramic body having an indentation for reception of a mated projection on another ceramic body so as to join the two bodies together.

Hence, it is the principal object of the present invention to provide a method for isostatic pressing whereby articles having one or more indentations in the surface thereof can be manufactured in a practical manner at relatively low cost. More specifically, the invention has as one of its objects the provision of a method whereby there can be manufactured, by isostatic pressing, a sintered body having one or more elongated bores or inserts in non-concentric relationship with the outer surface of the body and with an indentation in an end surface of the body.

Other objects, features and advantages of the invention will appear more clearly from the following detailed description of preferred embodiments thereof made with reference to the drawings in which.

Figure 1:
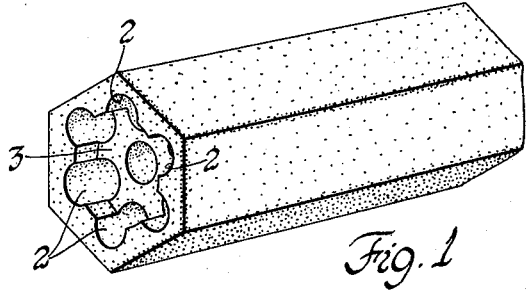
FIGURE 1 is a perspective view of a tubular shaped body made in accordance with the invention.

Referring now to FIGURE 1, there is shown a generally tubular shaped body which has a hexagonal exterior shape and a plurality of parallel cylindrical bores 2 extending therethrough. This multi-bored structure is typical of those required for numerous heat exchanger and the like applications. It might be made of ceramic or of metal depending upon the particular use for which designed. In order to make a good connection of such body to another body or member it is often necessary to provide the body with a recess 3 which can receive a mated projection on the other body or member. The present invention relates to the forming of the recess 3. In the particular embodiment shown, the recess is of generally hexagonal shape and the side walls of the recess intersect the bores 2. Therefore, the recess communicates with the bores and the bore side walls constitute portions of the side surfaces of the recess.

Figure 2:
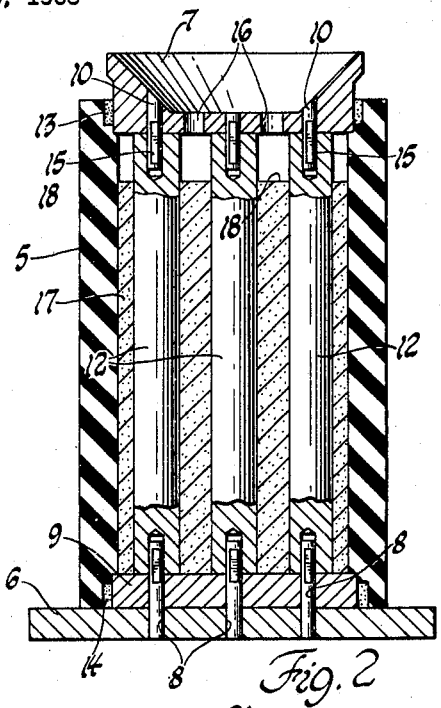
FIGURE 2 is the side view in section of apparatus for manufacturing the article shown in FIGURE 1 in accordance with the invention.

FIGURES 2 through 5 show the manner in which bodies of the configuration shown in FIGURE 1 can be manufactured in accordance with the present invention. In FIGURE 2, 5 is a tubular resilient rubber mold having a hexagonal shaped inner surface and extending between a metal base 6 and a metal filling cap 7. The base has spaced upwardly extending pins 8 secured thereto. These pins extend slidably through holes provided in the lower mold end plate 9 which is likewise of metal and which abuts the base 6. The filling cap 7 has downwardly extending pins 10 secured thereto, each of the pins 10 being aligned with one of the pins 8 which extend upwardly from the filling base. Extending between and supported by the pins 8 and 10 are arbors 12. In the embodiment shown these are a total of seven arbors, one being in the center and other six being in a hexagonal pattern surrounding the inner arbor to provide the arrangement of bores as shown in FIGURE 1. Each of these arbors has recesses at the top and bottom thereof for slidable mating engagement with a pair of the aligned bottom and top pins 8 and 10 respectively. To assure proper orientation of the filling cap with respect to the filling base in the assembly, a locating lug can be provided on each of the mold end plate 9 and the filling cap 7 for engagement with mating recesses in the resilient mold. Such is indicated at 13 for the filling cap and at 14 for the mold base member. Particularly where the arbors are other than round and where it is required that they have predetermined orientation, cross-sectionwise, with respect to each other and with respect to the rubber mold, the support pins 8 and 10 along with the mating recesses in the arbors, can be flat sided as shown at 15 such that the arbor recesses mate with the support pins only when the arbors are rotated to their proper predetermined orientation.

Figure 3:
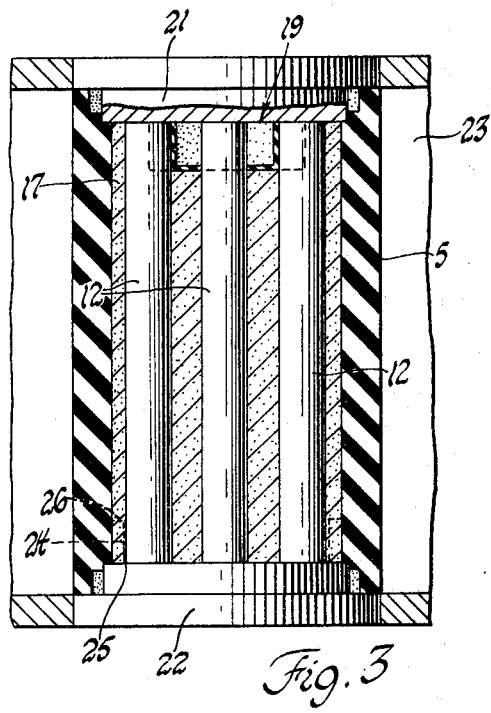
FIGURE 3 is a side view in section of the apparatus shown in FIGURE 2 but in a later step in the method and with certain parts removed and other parts added.
Figure 4:
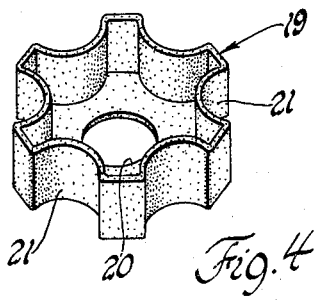
FIGURE 4 is a perspective view of one part of the apparatus shown in FIGURE 3.

The filling cap has openings 16 which communicate with the funnel shaped upper surface of the filling cap. With the mold assembled as shown, loose finely divided ceramic material, metal or other sinterable material 17 as desired, is fed into the mold through the openings 16 until the level of the material reaches the level indicated at 18. The filling cap 8 together with its associated pins 10 are then removed. To facilitate filling to the precise level desired, the filling cap can be so constructed as to extend down into the mold to the level 18 such that the mold can then be filled right up to the cap 16 and when cap 16 is subsequently removed the material will be at the level 18. There is then placed within the mold a thin walled compressible generally cup-shaped member 19 as shown in FIGURES 3 and 4. The bottom wall of the member 19 has a hole 20 in the center thereof, which fits over the center arbor, and the peripheral side wall of the member is formed with semicircular indentations 21 each of which abuts and extends half way around one of the six outer arbors. The member 19 is placed over the ceramic powder such that the bottom wall of the member 19 abuts the ceramic powder and the peripheral side wall extends upwardly as shown in FIGURE 3. The member 19 is of a soft easily compressible material. Soft rubber is excellent through other materials such as other soft elastomers or plastics can be used if desired. Though not essential it is desirable that the member be of a material which is resilient such that it returns to its original shape after compression. The thinner the walls, both bottom wall and side wall, the better though at least the side upwardly extending wall must be of sufficient thickness to retain its shape without support.

After the member 19 is placed in the assembly as described, additional ceramic powder material is then added to the mold around and inside the member 19 until the mold is filled after which a metal upper end plate 21 is positioned in the top of the mold. At this point it should be noted that the level 18 (see FIGURE 2) is such that, when the member 19 is positioned as described, the side wall of the member will extend to and abut the end plate 21 when the latter is assembled to the mold. That is, the thin-walled compressible member 19 encapsulates a portion of the material 17 between the member 19 and a wall of the mold, here plate 21 which forms the top wall of the mold.

It is important that the density of the material be relatively uniform within the mold and to accomplish this it is advantageous to vibrate the mold assembly during the filling operations. Such vibration assures against voids and hence provides optimum uniformity of density of the material within the mold from top to bottom and from side to side thereof.

As indicated above, the material introduced into the mold and from which the article is to be made should be in a loose finely divided compressible form. It is highly desirable that the material be in the form of extremely small spherical or other particles prepared by conventional processes and it is generally also advantageous to include a small amount of organic binder material, as well known in the art, to assure good green strength in the compact formed by the pressure application as will hereinafter be described. The aforesaid patents teach one manner of preparing the finely divided material, including a small amount of organic binder, for the isostatic pressing operation.

After the metal upper end plate 21 is assembled to snugly engage the upper end of the tubular collapsible mold 5, the mold assembly can be inverted and the filling base 6 and plate 9 replaced by a base plate 22 in a similar manner as 21. Neither of plates 21 or 22 have any pins such as 8 or 10.

Figure 5:
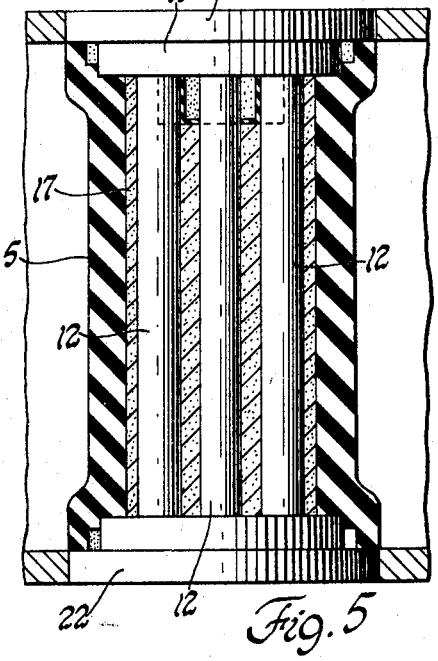
FIGURE 5 is a view of the apparatus shown in FIGURE 3 but at a later stage in the method of this invention.

With the arbor support pins 8 and 10 having thus been withdrawn, the arbors 12 are supported in their positions with respect to each other and with respect to the mold 5 solely by the ceramic or other material within the mold. Hence, the arbors are free to shift radially inwardly with material upon compression thereof just as though the arbors were part of the material. The mold assembly as shown in FIGURE 3 is placed within a conventional isostatic press which provides a chamber 23 filled with fluid, for example, oil or water, which surrounds the collapsible resilient mold 5. Fluid pressure is then applied to the exterior of the mold to cause radially inward movement of the tubular mold wall thereby tightly compressing the material within the mold. FIGURE 5 shows the assembly after such compression. As the material shifts radially inwardly during the compression, the arbors likewise shift radially inwardly with the material and the member 19 compresses inwardly with the material and without any kinking or bending. In other words, the member 19 is compressed radially inwardly to a smaller diameter or width but with the side wall remaining of the same height and without any unwanted distortion to a different shape.

After compression is complete, the fluid pressure is relieved and the resilient mold assumes its normal shape. The mold is removed from the pressing chamber and disassembled, and the compressed self-sustaining green compact, now free within the mold because of its small cross section, is removed from the mold. The arbors retain their same size and shape through the pressing operation and can be easily pushed out of the green compact from one end or the other thereof. Then the compressed ceramic powder within the cup-shaped member 19, and the member 19 itself, are removed. The result is an indentation in the upper end of the ceramic powder compact, an indentation of the precise shape and size desired.

The green compact is then fired, generally to sintering temperature, to complete the manufacture. The temperature used for firing will, of course, depend upon the material being used as is well known in the art. If desired, the member 19 with its enclosed compacted material can be left in the article instead of being removed prior to the firing operation. Then, during the firing operation the member 19 burns out and the ceramic material which was within the member 19 can be easily separated from the article after firing.

The invention has its chief utility in forming indentations or recesses in the ends of the article since indentations in the side surfaces are rather easily formed by machining of the compact prior to firing. However, the invention can, if desired, be used to form indentations in the side surfaces. For example, if it is desired to form an elongated article with an annular indentation at one end thereof to provide an end portion of reduced diameter, the insert member corresponding to 19 can be of a shape as indicated at 24 in FIGURE 3. The insert 24 has a tubular portion, the end 25 of which abuts one of the end plates of the mold, and has a radially outwardly extending flange 26 which abuts the side of the mold. Hence, after compaction the insert 24 along with the material between the insert and the mold walls can be removed to provide the desired annular indentation in the side surface of the article. Hence, while the invention has been described specifically with reference to a preferred embodiment thereof, it will be understood that various changes may be made all within the full and intended scope of the claims which follow.

The embodiments of the invention in which an exclusive property or privilege is claimed are defined as follows:

1. A method for making an article having an indentation in an end surface thereof by compaction of a compactible finely divided material comprising the steps of placing within a resilient collapsible generally tubular-shaped mold having an end plate a material in compactible finely divided form having embedded therein a thin-walled soft compressible rubber-like member which encapsulates a portion of said finely divided material between said thin-walled member and said end plate of the mold, applying pressure to the exterior of said mold to partially collapse said mold radially inwardly and thereby compact said finely divided material into a self-sustaining compact, and thereafter removing from said compact said thin-walled member and the material encapsulated between said thin-walled member and said end plate of the mold thereby providing an indentation in an end surface of said article.

2. A method as set forth in claim 1 wherein at least one arbor extends through said compactible finely divided material and through an opening in said compressible thin-walled member.

3. A method as set forth in claim 1 wherein a plurality of arbors extend through said compactible finely divided material and through openings in said compressible thin-walled member, said arbors being free to move radially inwardly with said material as it is compacted.

4. A method as set forth in claim 1 and including the step of firing said compact to sinter said finely divided material.

References Cited

UNITED STATES PATENTS

| | | |
|---|---|---|
| 2,893,062 | 7/1959 | Penrice. |
| 3,051,567 | 8/1962 | Ziegler. |
| 3,100,677 | 8/1963 | Frank et al. _____ 264—313 |

OTHER REFERENCES

D. G. Loomis: "Isostatic Pressing for Ceramics," Appearing in the July 1962 issue of Ceramic Age at pages 36–40.

J. J. Svec (Ed.): "Isostatic Pressing Expands Manufacturing Capabilities," Appearing in the November 1964 issue of Ceramic Industry Magazine at pages 54–55, 63, 66–67 and 70–71.

T. M. Wehrenberg et al.: "Isostatic Pressing Large Refractory Blocks," Appearing in the July 1968 issue of Ceramic Bulletin at pages 642–645.

JULIUS FROME, Primary Examiner

J. H. MILLER, Assistant Examiner

U.S. Cl. X.R.

264—59, 313, 317